US008137571B2

(12) United States Patent  (10) Patent No.: US 8,137,571 B2
Okada et al.  (45) Date of Patent: Mar. 20, 2012

(54) METHOD FOR MANUFACTURING PERPENDICULAR MAGNETIC RECORDING HEAD

(75) Inventors: Tomohiro Okada, Kanagawa (JP); Hisashi Kimura, Kanagawa (JP); Taku Shintani, Kanagawa (JP); Tadashi Umezawa, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 413 days.

(21) Appl. No.: 12/381,972

(22) Filed: Mar. 17, 2009

(65) Prior Publication Data

US 2009/0236307 A1    Sep. 24, 2009

(30) Foreign Application Priority Data

Mar. 24, 2008 (JP) ................................. 2008-075779

(51) Int. Cl.
*B44C 1/22* (2006.01)
(52) U.S. Cl. ................ 216/22; 216/62; 216/66; 216/67; 438/3; 204/192.34
(58) Field of Classification Search .................. None
See application file for complete search history.

(56) References Cited

U.S. PATENT DOCUMENTS

| | | | |
|---|---|---|---|
| 7,296,338 B2* | 11/2007 | Le et al. ................. | 29/603.16 |
| 7,321,198 B2 | 1/2008 | Kubota et al. | |
| 2001/0027026 A1* | 10/2001 | Dhindsa et al. ............... | 438/712 |
| 2007/0019327 A1 | 1/2007 | Maruyama et al. | |
| 2007/0029501 A1* | 2/2007 | Kubota et al. ............. | 250/423 R |
| 2007/0186409 A1* | 8/2007 | Etoh et al. .................. | 29/603.01 |
| 2007/0223140 A1* | 9/2007 | Hirabayashi et al. ......... | 360/126 |

FOREIGN PATENT DOCUMENTS

| | | |
|---|---|---|
| JP | 06-275730 | 9/1994 |
| JP | 2003-078185 | 3/2003 |

OTHER PUBLICATIONS

Ono et.al., Journal of Vacuum Science and Technology vol. A4, 1986, pp. 788-790.*

* cited by examiner

*Primary Examiner* — Lan Vinh
*Assistant Examiner* — Jiong-Ping Lu
(74) *Attorney, Agent, or Firm* — Zilka-Kotab, PC

(57) ABSTRACT

Embodiments of the present invention help to provide a method for manufacturing a perpendicular magnetic recording head including a main magnetic pole having a width that does not generally vary. According to one embodiment, a magnetic film, a first inorganic mask film, an organic film, a second inorganic mask film, and a resist pattern are formed in this order. Reactive ion etching (RIE) is performed using the resist pattern as a mask to etch the second inorganic mask film and the organic film and form a mask for the subsequent step. A flow rate of an Ar gas is then controlled, and ion milling is performed, to correct a difference between the width of the mask located at the central portion of the wafer and the width of the mask located at the outer peripheral portion of the wafer. The magnetic film is processed to have a uniform track width. Ion milling is then performed to form the main magnetic pole having an inverted trapezoidal shape.

17 Claims, 15 Drawing Sheets

METHOD FOR MANUFACTURING PERPENDICULAR MAGNETIC RECORDING HEAD

CROSS-REFERENCE TO RELATED APPLICATION

The instant nonprovisional patent application claims priority to Japanese Patent Application No. 2008-075779 filed Mar. 24, 2008, and which is incorporated by reference in its entirety herein for all purposes.

BACKGROUND OF THE INVENTION

With the recent development of the information society, it has been sought to increase an integration density and operation speed of a magnetic recording/reproducing device representing a magnetic disk device, and to reduce the size of the magnetic recording/reproducing device on the market. As perpendicular magnetic recording scheme can meet these needs. The perpendicular magnetic recording scheme is suitable for an increase in a surface recording density in principle. In the perpendicular magnetic recording scheme, the higher a linear recording density of a pattern recorded on a magnetic disk, the smaller the intensity of a diamagnetic field and the more the intensity of magnetization is stabilized. In addition, in the perpendicular magnetic recording scheme, a component (leaking in a direction of a track width) of a magnetic field generated from a recording head, is small.

As shown in FIG. 16, a perpendicular magnetic recording head is structured by laminating a read unit 14 and a write unit 15. The read unit 14 has a lower shield layer 8, a read element 9 and an upper shield layer 10. The read element 9 is located between the lower and upper shield layers 8 and 10. A portion of the read element 9 is exposed to an air bearing surface. A giant magnetoresistance effect head, a tunnel giant magnetoresistance effect head capable of providing a large reproduction output, a current perpendicular to plane (CPP) giant magnetoresistance effect head capable of causing a current to flow perpendicularly to a film surface, or the like, may be used as the read element 9. The write unit 15 has a magnetic gap formed on the side of the air bearing surface. The write unit 15 has a main magnetic pole 13 and an auxiliary magnetic pole 11. The main magnetic pole 13 and the auxiliary magnetic pole 11 are magnetically coupled with each other on the opposite side to the air bearing surface. The write unit 15 also has a coil 12 provided between the main magnetic pole 13 and the auxiliary magnetic pole 11. A magnetic shield 16 is provided around the main magnetic pole 13. A soft magnetic underlayer 18 is provided under a recording layer 17 included in the magnetic disk 2 since it is necessary that a component (measured in a direction perpendicular to the surface of the magnetic disk 2) of a magnetic field generated from the main magnetic pole 13 be used to record data in a perpendicular magnetic recording scheme. The surface of the soft magnetic underlayer 18 faces the surface of the main magnetic pole 13. Therefore, a high-intensity component (measured in the direction perpendicular to the surface of the magnetic disk 2) of a magnetic field can be generated. A magnetic flux present in the soft magnetic underlayer 18 is returned by the auxiliary magnetic pole 11 and circles.

In order to realize a high recording density, it is necessary to realize a high linear recording density (BPI) and a high track density (TPI). To increase the BPI, it is necessary to improve the gradient of a magnetic field generated from a write head and improve resolution of a read head. In order to increase the TPI, it is necessary to reduce a track width of the write head and reduce magnetic side writing. Japanese Patent Publication No. 2007-35082 ("Patent Document 1") discloses a technique for a perpendicular magnetic recording head. The perpendicular magnetic recording head disclosed in Patent Document 1 has a trailing shield and a side shield around a main magnetic pole in order to reduce magnetic side writing and improve a magnetic field gradient. A first nonmagnetic film is provided between the main magnetic pole and the trailing shield, while a second nonmagnetic film is provided between the main magnetic pole and the side shield. The first nonmagnetic film is made of a material different from a material of the second nonmagnetic film, and formed by a method different from a method used to form the second nonmagnetic film. This improves accuracy of the thickness of the first nonmagnetic film, although the thickness of the first nonmagnetic film may affect the intensity of a magnetic field. Therefore, the technique disclosed in Patent Document 1 realizes the perpendicular magnetic recording head having a small track width, and allows the perpendicular magnetic recording head to be produced in large quantities.

As described above, in order to achieve a high recording density by means of the perpendicular magnetic recording head, it is effective to reduce a track width of the main magnetic pole, form a nonmagnetic gap that is located between the main magnetic pole and the trailing shield and has a length (film thickness) with high accuracy. It is, however, found out that the following problems to be solved further exist through study conducted by the present inventors and other persons. A write head constituting a part of the perpendicular magnetic recording head is formed on a wafer by a thin film formation process such as sputtering, ion milling, and photolithography. In order to form a main magnetic pole of the write head, a magnetic film is formed, and a mask member is formed on the magnetic film. Then, a mask pattern is formed by reactive ion etching (RIE). The magnetic film is then subjected to ion milling using the mask pattern. In this way, the main magnetic pole of the write head is formed. Since etching at an outer peripheral portion of the wafer progresses more easily than etching at a central portion of the wafer during the RIE based on characteristics of the RIE, the width of a central portion of the mask pattern present on the wafer is large, and the width of an outer peripheral portion of the mask pattern present on the wafer is small. If the ion milling is performed using this mask pattern, the width of a central portion of the main magnetic pole is large, and the width of an outer peripheral portion of the main magnetic pole is small. Therefore, even when the same wafer is used, perpendicular magnetic recording heads are manufactured, which are provided with main magnetic poles that are located at the central portion of the wafer and at the outer peripheral portion of the wafer and have respective widths different from each other. The variation in the widths of the main magnetic poles may cause a variation in recording characteristics. It is therefore necessary to reduce the variation in the widths of the main magnetic poles.

Japanese Patent Publication No. 6-275730 ("Patent Document 2") describes the following. That is, in a process for forming a multi-layer wiring using an organic film as an interlayer insulating film, when Ar ion milling is performed in order to remove a metal oxide from the surface of an underlying metal wiring layer, a non-uniform distribution tends to occur on the surface of a wafer forming a multi-layer wiring substrate, and the Ar ion milling tends to be performed on a central portion of the wafer at high speed and on an outer peripheral portion of the wafer at low speed. Even when the metal oxide is removed from the surface of the underlying metal wiring layer at the central portion of the wafer, the metal oxide may remain on the surface of the underlying metal wiring layer at the outer peripheral portion of the wafer. Thus, the metal oxide may be non-uniformly removed from the surface of the underlying metal wiring layer present on the wafer. To solve the problem, an oxide layer formed on the surface of the underlying metal wiring layer is removed by reactive ion etching using an Ar gas and ion milling using an Ar gas, i.e., by combining reactive ion etching using an Ar gas having a tendency of the opposite in-plane distribution of the etching rate with ion milling using an Ar gas having the tendency. In addition, Japanese Patent Publication No. 2003-78185 ("Patent Document 3") discloses a method for uniformly controlling an etching depth in a substrate in the following etching process. In the process of etching an upper ferromagnetic layer included in a ferromagnetic tunnel junction structure having a body formed by laminating a lower ferromagnetic layer, a tunnel barrier layer and the upper ferromagnetic layer, and having a magnetic bias layer formed above the laminated body via a gap layer, a portion ranging from the magnetic bias layer to a part of the gap layer is processed by using ion milling. Then, the gap layer remaining after the ion milling is removed by reactive ion etching to ensure that the upper ferromagnetic layer is exposed. After that, the upper ferromagnetic layer is processed by ion milling. Each of Patent Documents 2 and 3 discloses that the reactive ion etching and the ion milling are combined to uniformly control the etching depth in the wafer or the substrate. However, Patent Documents 2 and 3 do not describe that when ion milling is performed in a process of forming a main magnetic pole of a perpendicular magnetic recording head after reactive ion etching, the width of the main magnetic pole at a central portion of a wafer is large and the width of the main magnetic pole at an outer peripheral portion of the wafer is small. Furthermore, Patent Documents 2 and 3 do not describe a method for controlling the variation in the width of the main magnetic pole.

BRIEF SUMMARY OF THE INVENTION

In reactive ion etching (RIE) performed during formation of a main magnetic pole of a perpendicular magnetic recording head, etching at an outer peripheral portion of a wafer progresses more easily than etching at a central portion of the wafer. The width of a mask pattern on the central portion of the wafer is large, while the width of the mask pattern on the outer peripheral portion of the wafer is small. When ion milling is performed in this state, the width of the main magnetic pole located at the central portion of the wafer is large, while the width of the main magnetic pole located at the outer peripheral portion of the wafer is small.

Embodiments of the present invention help to provide a method for manufacturing a perpendicular magnetic recording head including a main magnetic pole having a width that does not generally vary. According to the embodiment of FIG. 2, a magnetic film 440, a first inorganic mask film 442, an organic film 444, a second inorganic mask film 446, and a resist pattern 448 are formed in this order. Reactive ion etching (RIE) is performed using the resist pattern 448 as a mask to etch the second inorganic mask film 446 and the organic film 444 and form a mask for the subsequent step. A flow rate of an Ar gas is then controlled, and ion milling 1 is performed, to correct a difference between the width of the mask located at the central portion of the wafer and the width of the mask located at the outer peripheral portion of the wafer. The magnetic film 440 is processed to have a uniform track width. Ion milling 2 is then performed to form the main magnetic pole 44 having an inverted trapezoidal shape.

DETAILED DESCRIPTION OF THE INVENTION

Figure 1:
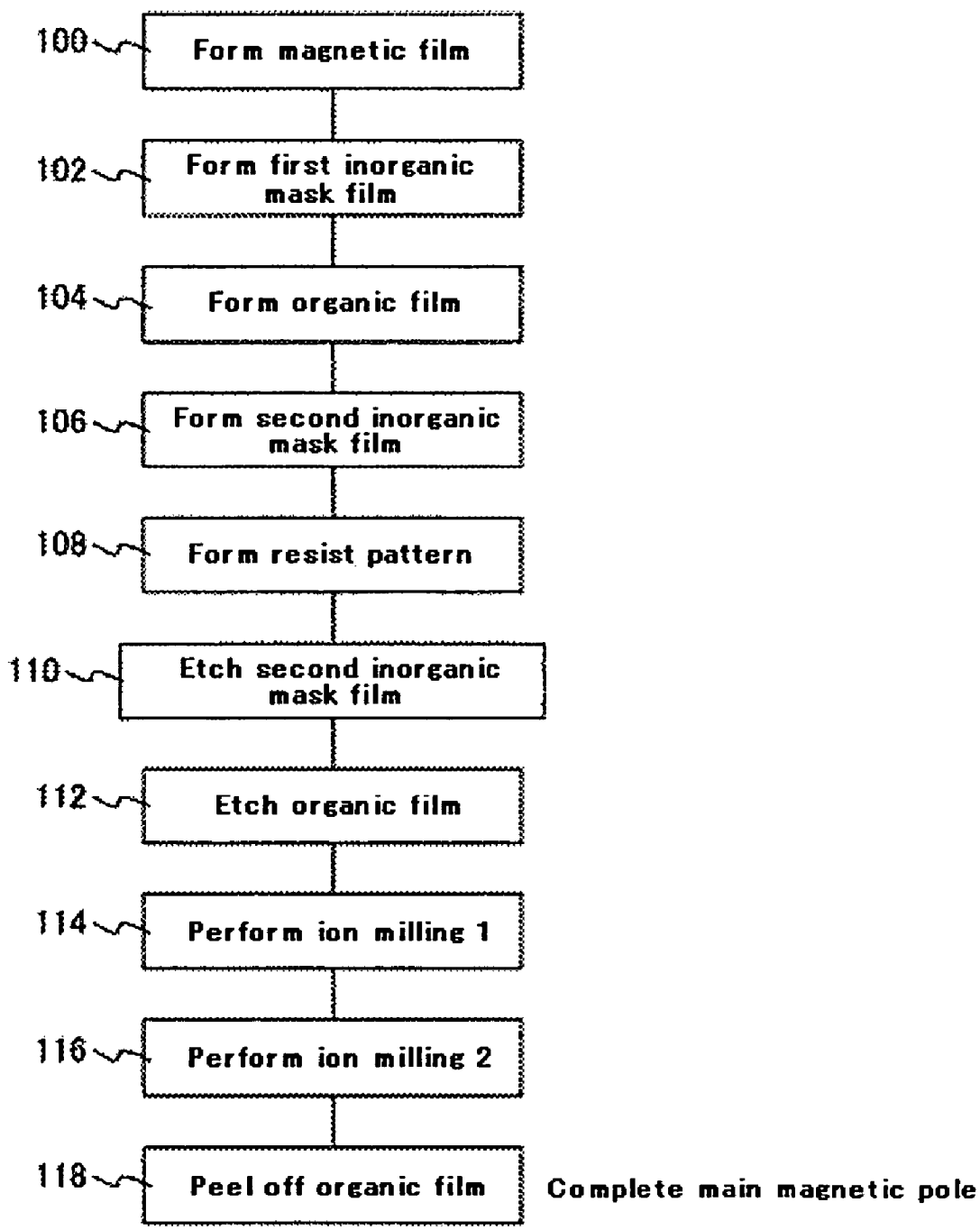
FIG. 1 is a flowchart of a method for forming a main magnetic pole according to an embodiment of the present invention.

Embodiments of the present invention relate to a method for manufacturing a perpendicular magnetic recording head mounted in a magnetic recording/reproducing device, and more particularly to a method for manufacturing a perpendicular magnetic recording head including a main magnetic pole having a width that does not generally vary.

An object of embodiments of the present invention is to provide a method for manufacturing a perpendicular magnetic recording head including a main magnetic pole having a width that does not generally vary.

A typical method for manufacturing a perpendicular magnetic recording head according to an embodiment of the present invention comprises the steps of: forming a main magnetic pole; forming an auxiliary magnetic pole; and forming a coil, wherein the step of forming the main magnetic pole includes the sub-steps of: forming a magnetic film above a wafer; forming a mask member on the magnetic film; performing reactive ion etching (RIE) on the mask member to form a mask; and performing ion milling on the mask under the condition that a milling rate at a central portion of the wafer is higher than a milling rate at an outer peripheral portion of the wafer in order to correct a difference between a large width of the mask located at the central portion of the wafer and a small width of the mask located at the outer peripheral portion of the wafer, and performing ion milling on the magnetic film, the difference occurring during the reactive ion etching (RIE).

A flow rate of an Ar gas may be controlled in order to set the milling rate at the central portion of the wafer to be higher than the milling rate at the outer peripheral portion of the wafer in the sub-step of performing the ion milling on the mask and performing the ion milling on the magnetic film. The flow rate of the Ar gas may be set to 24 sccm or more.

Pressure of the Ar gas may be controlled in order to set the milling rate at the central portion of the wafer to be higher than the milling rate at the outer peripheral portion of the wafer in the sub-step of performing the ion milling on the mask and performing the ion milling on the magnetic film.

Power supplied to a plasma source may be controlled in order to set the milling rate at the central portion of the wafer to be higher than that at the outer peripheral portion of the wafer in the sub-step of performing the ion milling on the mask and performing the ion milling on the magnetic film.

An ion acceleration current may be controlled in order to set the milling rate at the central portion of the wafer to a higher level than that at the outer peripheral portion of the wafer in the sub-step of performing the ion milling on the mask and performing the ion milling on the magnetic film.

The mask member may be a film formed by laminating a first inorganic film made of $Al_2O_3$, an organic film and a second inorganic film made of $SiO_2$.

The method for manufacturing a perpendicular magnetic recording head may further comprise the step of forming a read head before the steps of forming the main magnetic pole, the auxiliary magnetic pole and the coil.

The step of forming the read head may include the sub-step of forming a magnetoresistance effect element between a lower magnetic shield and an upper magnetic shield, and the magnetoresistance effect element be either one of a giant magnetoresistance effect (GMR) element, a tunnel magnetoresistance effect (TMR) element and a current perpendicular to plane (CPP) GMR element capable of causing a current to flow perpendicularly to a film surface.

According to embodiments of the present invention, a perpendicular magnetic recording head including a main magnetic pole having a width that does not generally vary, can be obtained.

Figure 14:
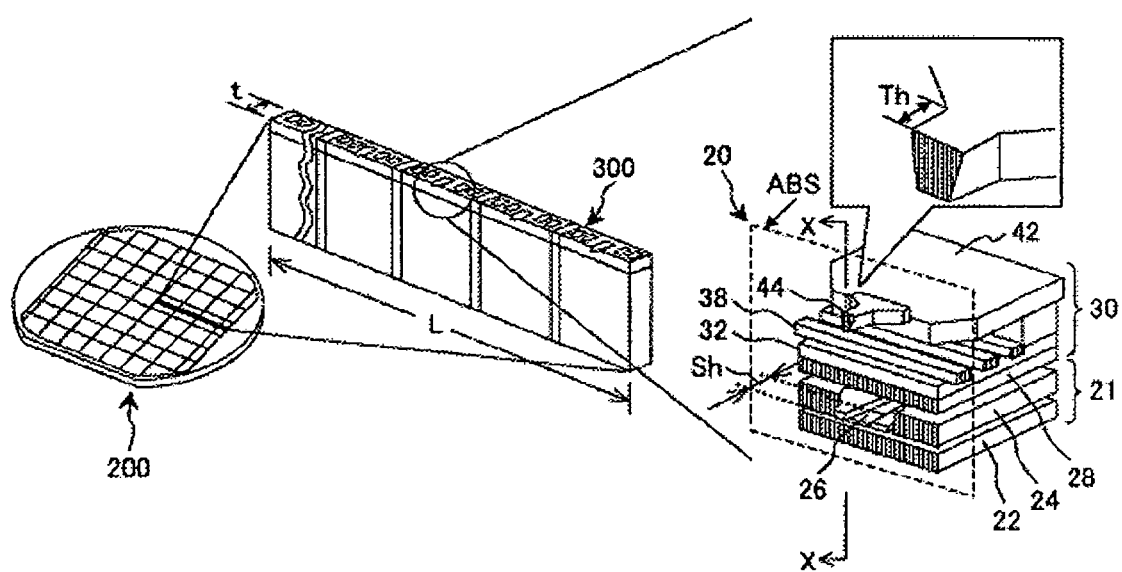
FIG. 14 is a diagram showing the wafer, a row bar, and an outline configuration of the perpendicular magnetic recording head.
Figure 15:
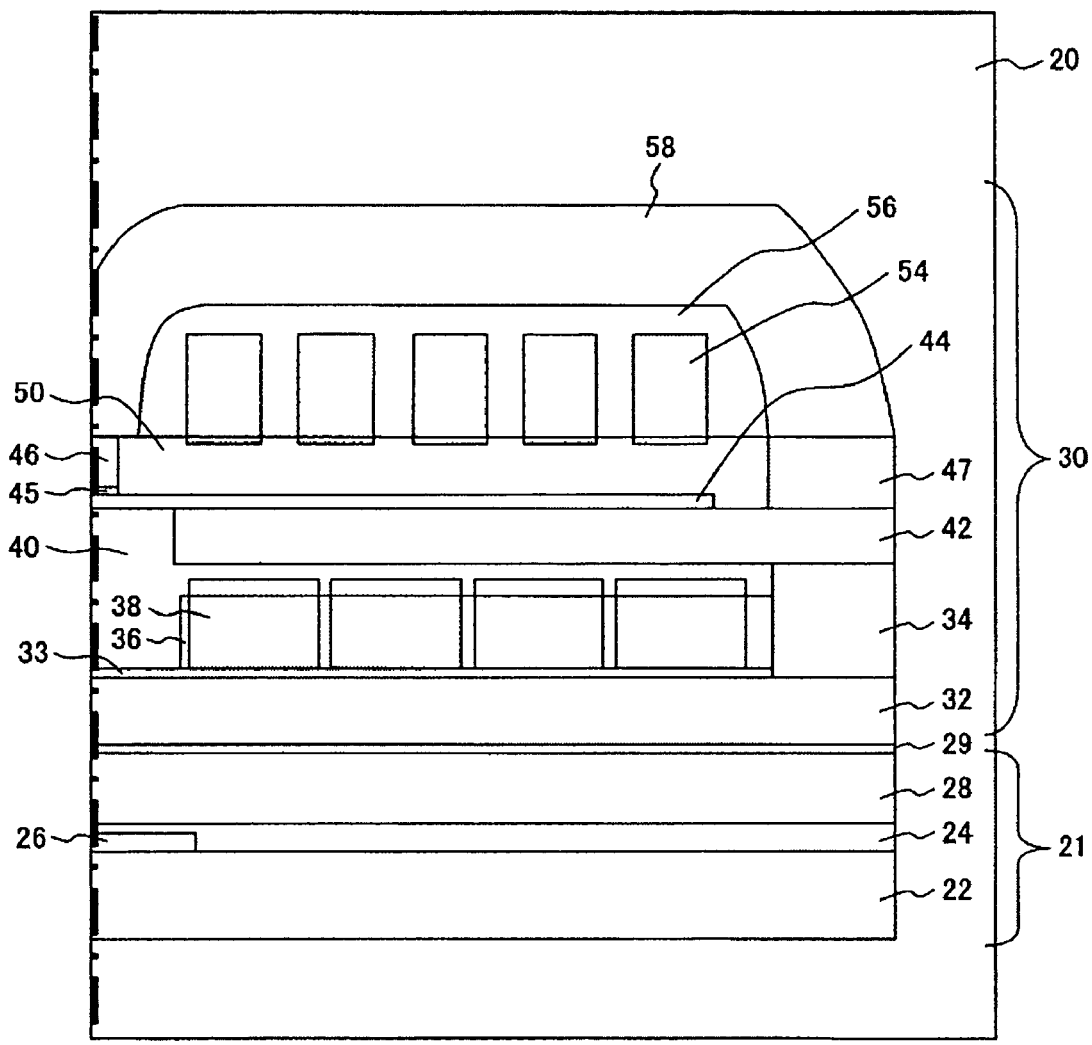
FIG. 15 is a cross sectional view taken along line X-X of FIG. 12 and shows a layer configuration of the perpendicular magnetic recording head.
Figure 16:
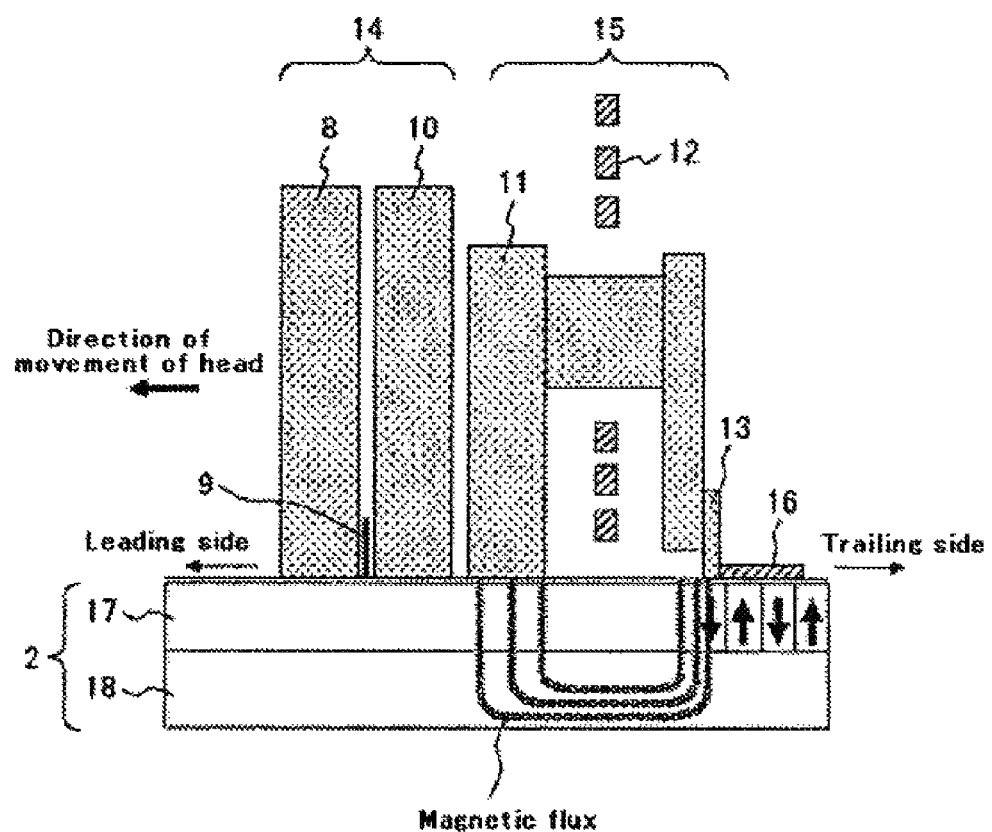
FIG. 16 is a schematic diagram showing the principle of perpendicular magnetic recording.

First, with reference to FIGS. 14 and 15, a description will be made of the configuration of a perpendicular magnetic recording head to which a manufacturing method according to an embodiment of the present invention is applied. FIG. 14 is a diagram showing a wafer 200, a row bar 300 cut from the wafer 200, and an outline configuration of a perpendicular magnetic recording head 20 provided on the row bar 300. FIG. 15 is a cross sectional view taken along line X-X of FIG. 14 and shows a layer configuration of the perpendicular magnetic recording head 20. As shown in FIGS. 14 and 15, the perpendicular magnetic recording head 20 has a write head 30 and a read head 21. The write head 30 is a single magnetic pole head and has a main magnetic pole 44, a magnetic yoke 42, a lower auxiliary magnetic pole (first auxiliary magnetic pole) 32, a first layer coil 38, a second layer coil 54 (not shown in FIG. 14), a wrap around shield 46 (not shown in FIG. 14), and an upper auxiliary magnetic pole (second auxiliary magnetic pole) 58 (not shown in FIG. 14). The first layer coil 38 and the second layer coil 54 constitute a helical coil. The wrap around shield 46 covers a portion (on the side of an air bearing surface) of the main magnetic pole 44. The write head 30 uses the helical coil as a coil. A pancake type coil having one or two layers may be used in place of the helical coil. In addition, a trailing shield may be provided on a trailing side of the main magnetic pole 44 in place of the wrap around shield 46. The upper auxiliary magnetic pole 58 may be removed. Alternatively, the lower auxiliary magnetic pole 32 and the first layer coil 38 may be removed, while the perpendicular magnetic recording head 20 may be configured with the main magnetic pole 44, the magnetic yoke 42, the wrap around shield 46, the second layer coil 54 and the upper auxiliary magnetic pole 58. The read head 21 is a magnetoresistance effect read head and has a magnetoresistance effect element 26 that is sandwiched between a lower magnetic shield layer 22 and an upper magnetic shield layer 28 and located in a nonmagnetic gap layer 24. A giant magnetoresistance effect (GMR) element, a tunnel magnetoresistance effect (TMR) element capable of providing a large reproduction output, a CPP GMR element capable of causing a current to flow perpendicularly to a film surface or the like may be used as the magnetoresistance effect element 26. The read head 21 and the write head 30 are separated by an insulating separating layer 29.

Figure 13:
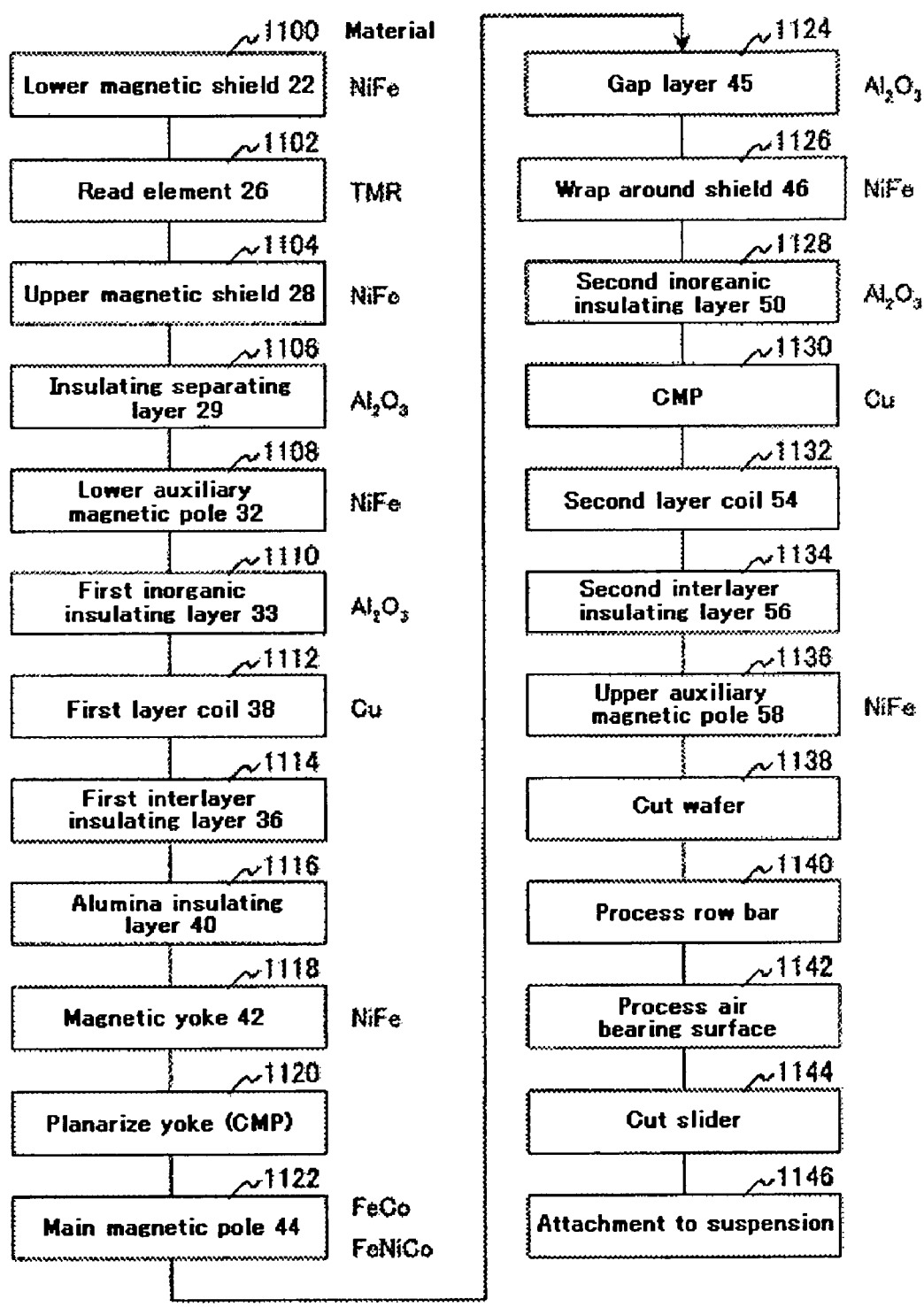
FIG. 13 is a flowchart showing a method for manufacturing a perpendicular magnetic recording head according to an embodiment of the present invention.

Next, a description will be made of a method for manufacturing the perpendicular magnetic recording head 20 with reference to FIG. 13. The method is described also with reference to FIGS. 14 and 15. The lower magnetic shield 22 is formed on the wafer 200 by a plating method and made of NiFe or the like (step 1100). Next, the nonmagnetic gap layer 24 and the read (TMR) element 26 are formed by sputtering (step 1102). The nonmagnetic gap layer 24 is made of alumina ($Al_2O_3$) or the like. Then, the upper magnetic shield 28 is formed by a plating method and made of NiFe or the like (step 1104). In this way, the read head 21 is completed.

Next, the insulating separating layer 29 is formed by sputtering and made of alumina or the like (step 1106). The lower auxiliary magnetic pole 32 is formed on the insulating separating layer 29 by a plating method and made of NiFe or the like, and a first back yoke 34 is formed on the lower auxiliary magnetic pole 32 by a plating method (step 1108). Subsequently, a first inorganic insulating layer 33 is formed on the lower auxiliary magnetic pole 32 by sputtering and made of alumina or the like (step 1110). The first layer coil 38 is formed on the first inorganic insulating layer 33 by a plating method and made of copper or the like (step 1112). A first interlayer insulating layer 36 such as a resist is formed between portions of the first layer coil 38 (step 1114). An alumina insulating layer 40 is formed on the first layer coil 38 and in a gap portion present on the side of the air bearing surface (step 1116). Then, the magnetic yoke 42 is formed on a recessed portion of the alumina insulating layer 40 and on the first back yoke 34 by a plating method and made of NiFe (step 1118). Then, an upper portion of the magnetic yoke 42 and an upper portion of the alumina insulating layer 40 are planarized by chemical mechanical polishing (CMP) (step 1120). Then, the main magnetic pole 44 is formed by sputtering and made of FeCo, FeNiCo or the like (step 1122).

Next, a gap layer 45 is formed around a portion (located on the side of the air bearing surface) of the main magnetic pole 44 by sputtering and made of alumina or the like (step 1124). A wrap around shield 46 is formed around a gap layer 45 (on the trailing side and both sides) by a plating method and made of NiFe or the like, and a second back yoke 47 is formed on a rear portion of the magnetic yoke 42, simultaneously (step 1126). Subsequently, a second inorganic insulating layer 50 is formed between the wrap around shield 46 and the second back yoke 47 and made of alumina or the like (step 1128). An upper portion of the wrap around shield 46, an upper portion of the second inorganic insulating layer 50, and a upper portion of the second back yoke 47 are planarized by chemical mechanical polishing (CMP) (step 1130). Then, the second layer coil 54 is formed on the second inorganic insulating layer 50 by a plating method and made of copper or the like (step 1132). A second interlayer insulating layer 56 such as a resist is formed between portions of the second layer coil 54 and on the second layer coil 54 (step 1134). Then, the upper auxiliary magnetic pole 58 is formed on the wrap around shield 46, the second interlayer insulating layer 56 and the second back yoke 47, and made of NiFe or the like (step 1136). In this way, the write head 30 is completed.

Next, a row bar 300 is cut from the wafer 200 (step 1138). The row bar 300 is processed to determine a throat height (Th) of the write head 30 and a sensor height (Sh) of the read head 21 (step 1140). The air bearing surface (ABS) is processed (step 1142). The row bar 300 is cut on a slider basis to obtain respective perpendicular magnetic recording heads 20 (step 1144). The perpendicular magnetic recording heads 20 are attached to a suspension in the following step (step 1146) to form a head gimbal assembly.

Next, the step (step 1122) of forming the main magnetic pole in the manufacturing method, which is a feature of an embodiment of the present invention, will be described with reference to FIGS. 1 and 2. A magnetic film 440 is formed on the magnetic yoke 42 and the alumina insulating layer 40 by sputtering and made of FeCo, FeNiCo or the like (step 100). It should be noted that the magnetic yoke 42 and the alumina insulating layer 40 are planarized by the chemical mechanical polishing (CMP) in step 1120 of the manufacturing method. Then, a first inorganic mask film (first inorganic film) 442 is formed by sputtering and made of alumina or the like (step 102). An organic film 444 is then formed by a coating method (step 104). A second inorganic mask film (second inorganic film) 446 is formed by sputtering and made of $SiO_2$ or the like (step 106). In this way, a mask member is formed. Then, a resist pattern 448 is formed on the mask member by coating, exposure and development (step 108) (FIG. 2(1)). Next, the second inorganic mask film 446 and the organic film 444 are etched (steps 110 and 112) (FIG. 2(2)) by reactive ion etching (RIE) using the resist pattern 448 as a mask to form a mask for ion milling in the subsequent step. RIE conditions for the second inorganic mask film ($SiO_2$) 446 are: wafer bias power of 700 W; power of 450 W supplied to a plasma source; a gas of $CHF_3$; and gas pressure of 5 mTorr. RIE conditions for the organic film 444 are: wafer bias power of 160 W; power of 240 W supplied to a plasma source; a gas of $CO_2$; and gas pressure of 45 mTorr.

Figure 3:
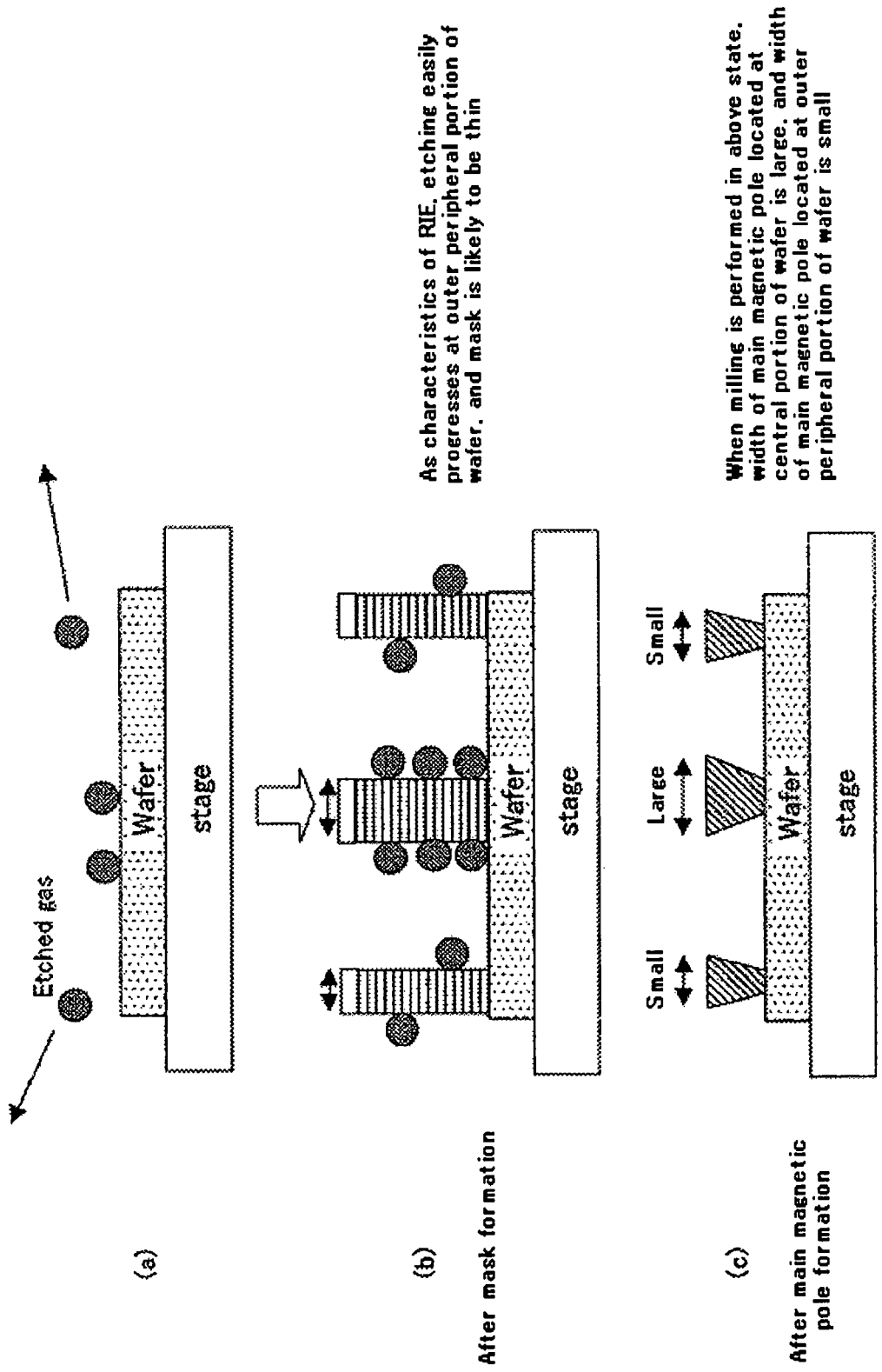
FIGS. 3(a) to 3(c) are diagrams each showing characteristics of RIE performed to form the main magnetic pole.
Figure 4:
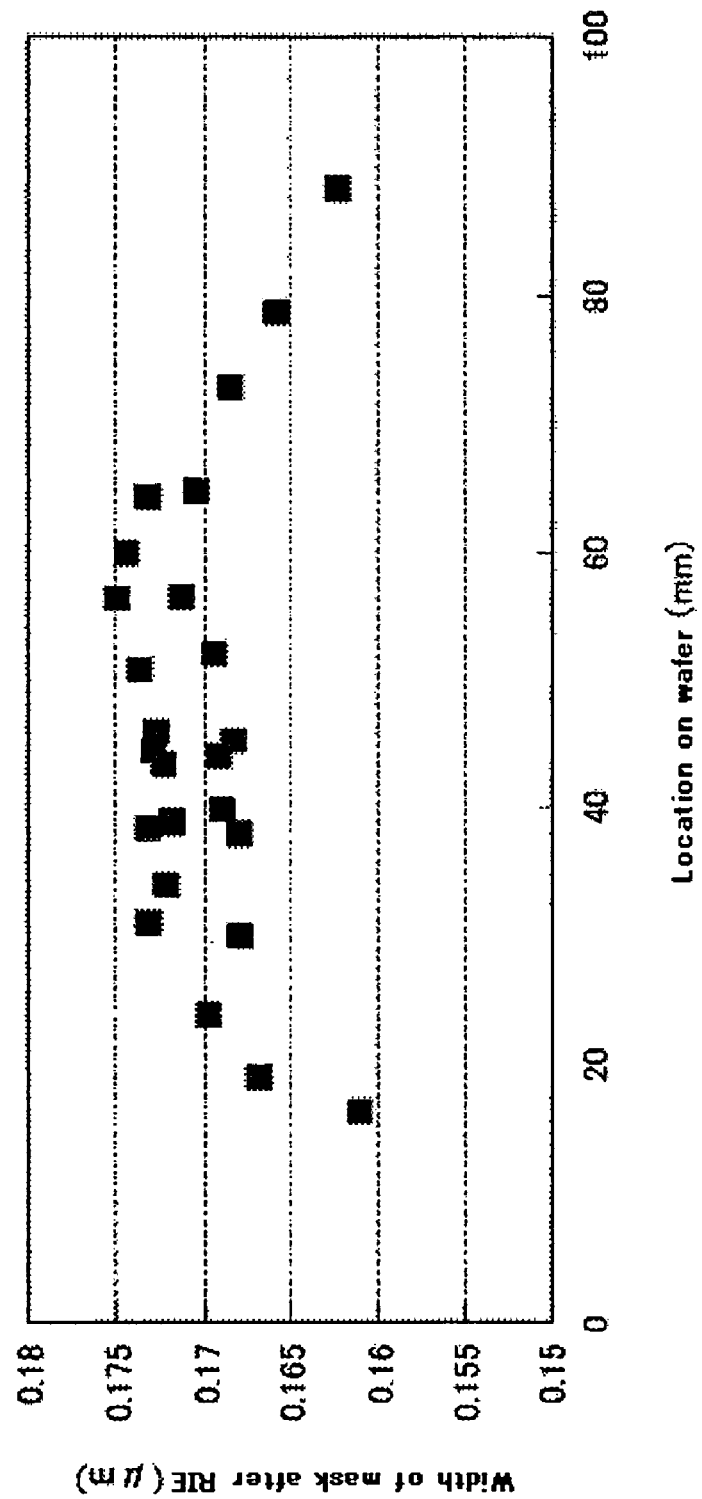
FIG. 4 is a graph showing a variation in the width of a mask member after the RIE.

The shape of the mask after the RIE will be described with reference to FIGS. 3(a) to 3(c). As shown in FIG. 3(a), when the wafer is subjected to the RIE, etching at an outer peripheral portion of the wafer easily progresses based on characteristics of the RIE. As shown in FIG. 3(b), the mask located at the outer peripheral portion of the wafer is narrower (thinner) than the mask located at a central portion of the wafer. When the magnetic film 440 is subjected to the ion milling in this state, the width of the main magnetic pole 44 located at the central portion of the wafer is large, and the width of the main magnetic pole 44 located at the outer peripheral portion of the wafer is small, based on the size of the mask, as shown in FIG. 3(c). FIG. 4 shows a variation in the width of the mask located on the wafer after the RIE. A location on the wafer is plotted along an abscissa axis, and the width of the mask after the RIE is plotted along an ordinate axis. It is apparent that the width of the mask located at the outer peripheral portion of the wafer is small. As shown in FIG. 4, a variation in the widths of the masks on the wafer is approximately 13 nm in this state.

Figure 2:
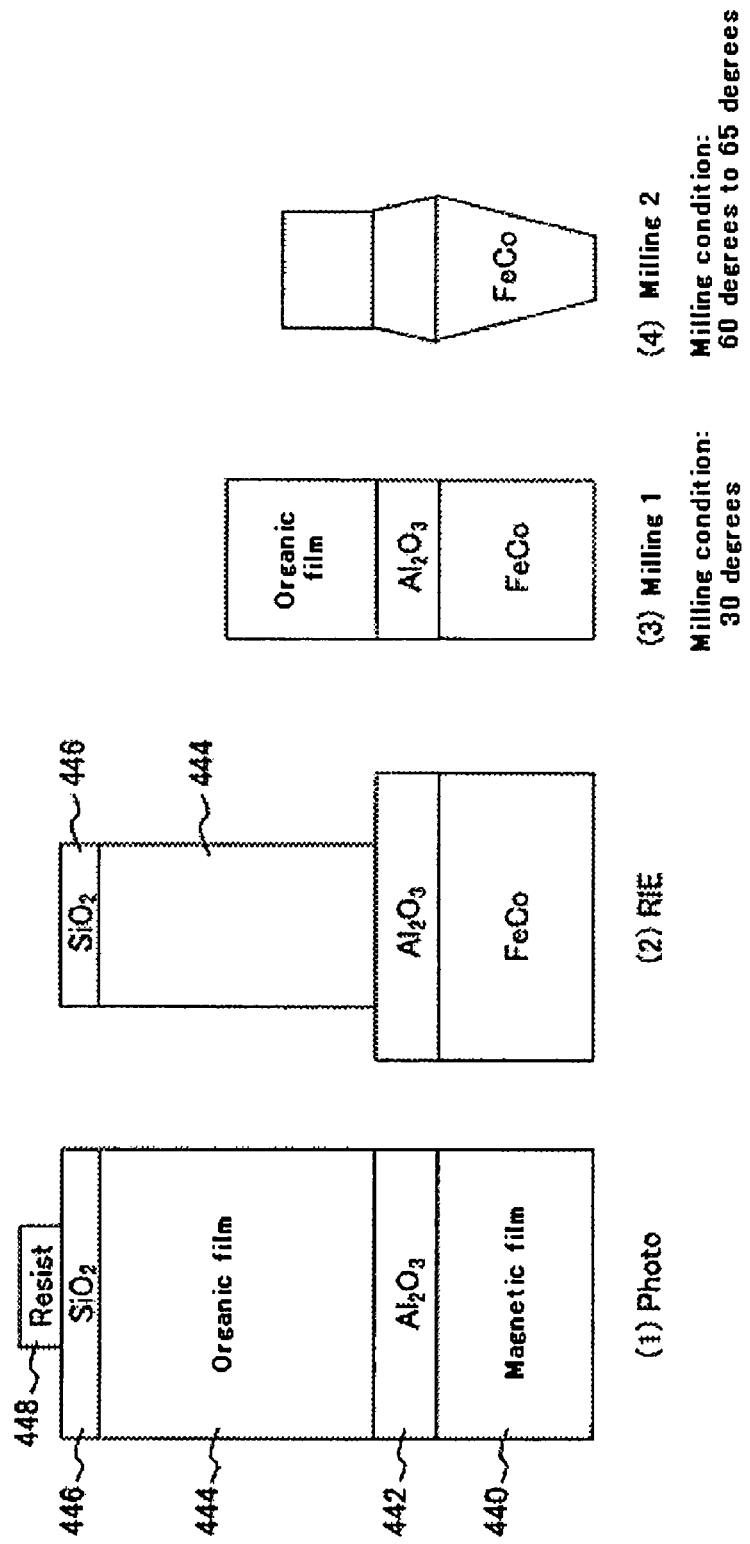
FIGS. 2(1) to 2(4) are diagrams each showing the relationship between a magnetic film and a mask member in a process of forming the main magnetic pole.

In one embodiment, as shown in FIGS. 1 and 2, a flow rate of the Ar gas is controlled in ion milling 1 (step 114) (FIG. 2(3)) to increase a milling rate at the central portion of the wafer after the RIE process (step 112) (FIG. 2(2)) in order to correct the variation (occurring in the RIE process) in the width of the mask on the wafer. An incident angle of an ion used for the ion milling 1 is approximately 30 degrees. This reduces the variation in the width of the mask at the central portion of the wafer and at the outer peripheral portion of the wafer, and reduces the variation in the width (track width) of the main magnetic pole obtained after the ion milling 1.

Figure 5:
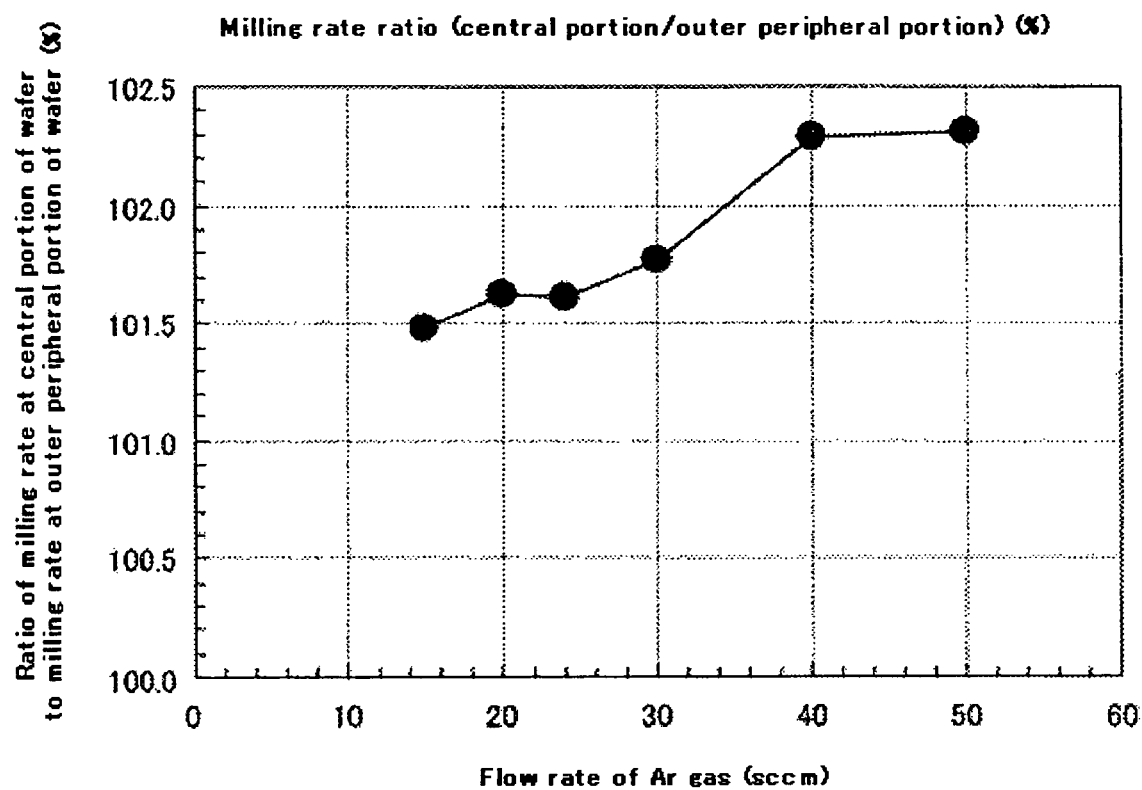
FIG. 5 is a graph showing the relationship between a flow rate of an Ar gas and a milling rate ratio (central portion/outer peripheral portion).
Figure 6:
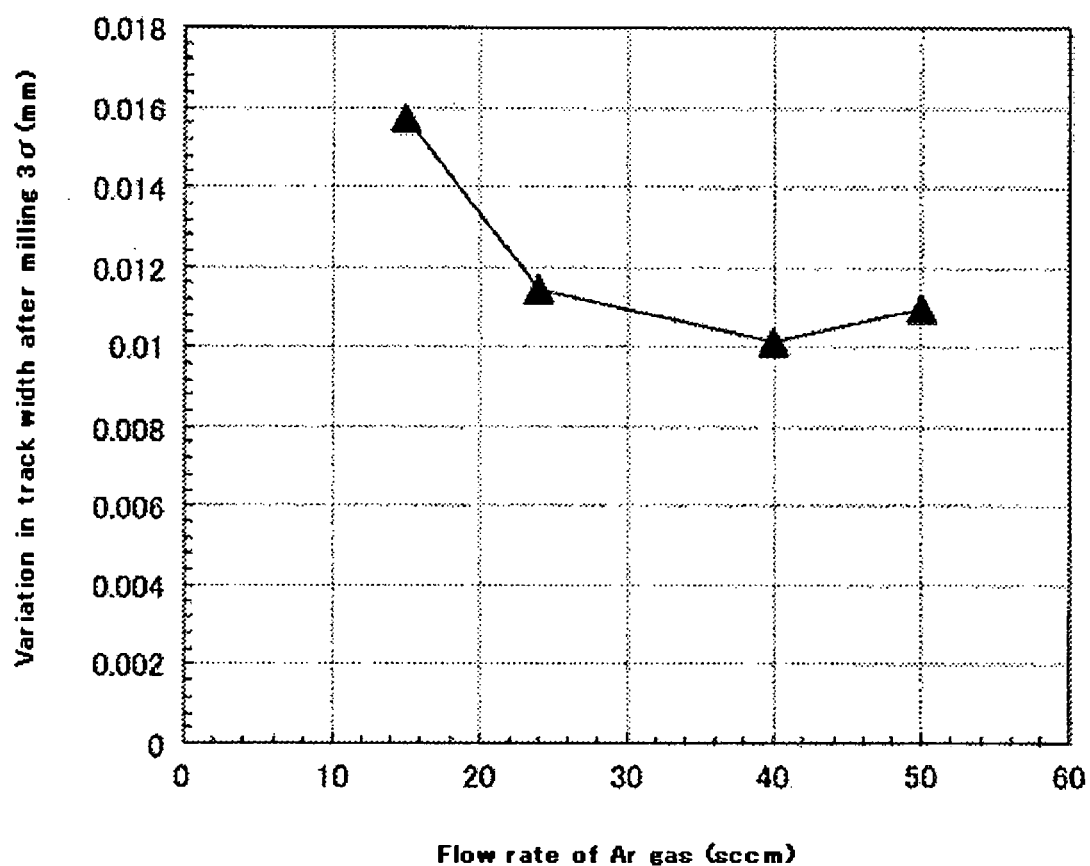
FIG. 6 is a graph showing the relationship between the flow rate of the Ar gas and a variation in the width of the main magnetic pole obtained after ion milling.
Figure 7:
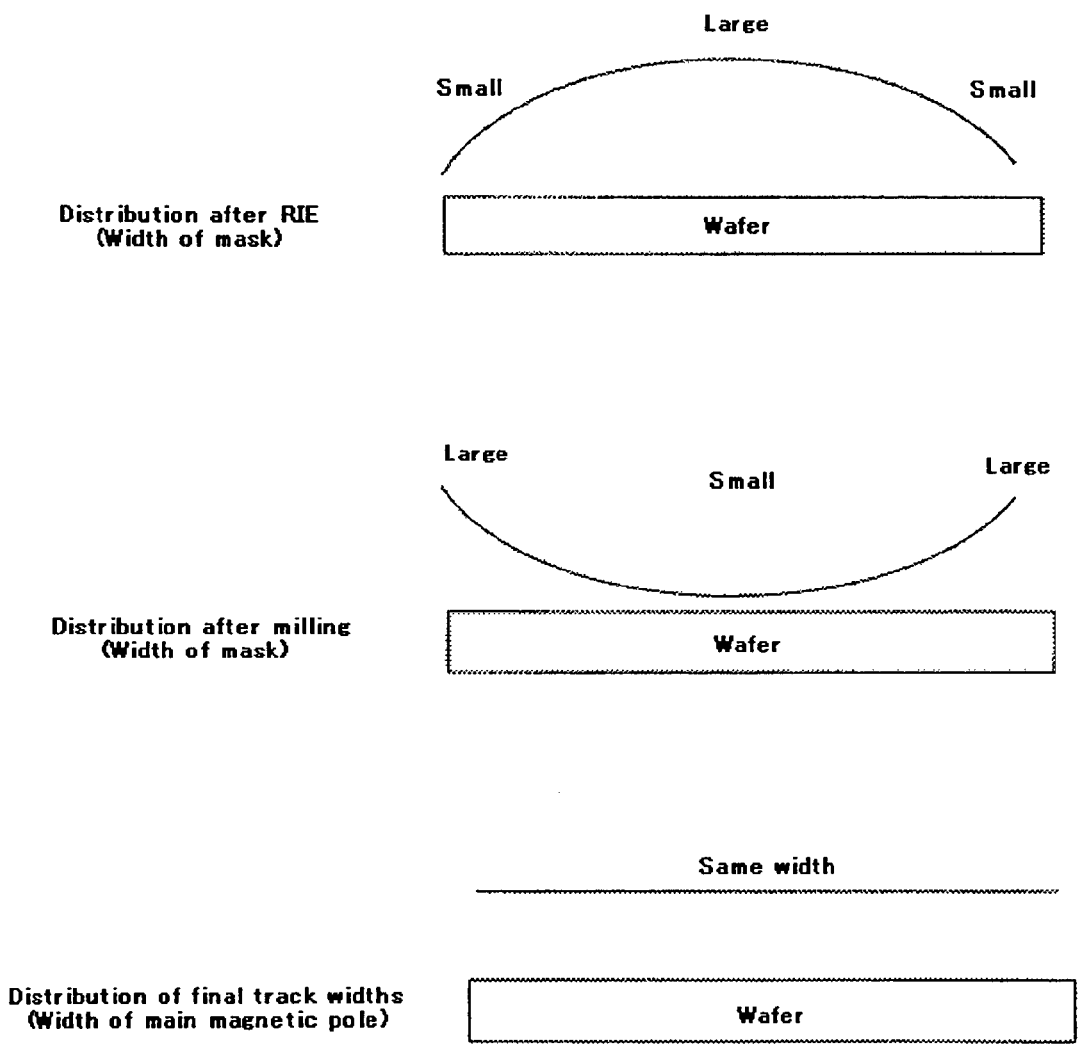
FIG. 7 is a schematic diagram showing the principle of correcting a variation (occurring during the RIE) in the width of a mask member and forming the main magnetic pole having a uniform width.

FIG. 5 shows the relationship between the flow rate (sccm) of the Ar gas and a milling rate ratio (central portion/outer peripheral portion). The milling rate at the central portion of the wafer can be increased by increasing the flow rate of the Ar gas. FIG. 6 shows the relationship between the flow rate of the Ar gas and the variation in the track width of the main magnetic pole obtained after the ion milling. The variation in the track width of the main magnetic pole obtained after the ion milling can be reduced by increasing the flow rate of the Ar gas. As apparent from FIG. 6, it is desired to set the flow rate of the Ar gas to 24 sccm or more. The results are schematically shown in FIG. 7. As shown in FIG. 7, the difference (occurring in the RIE process) between the large width of the mask located at the central portion of the wafer and the small width of the mask located at the outer peripheral portion of the wafer is eventually corrected by controlling the flow rate of the Ar gas in the ion milling 1 process to make it possible to form the main magnetic pole having a track width that does not generally vary at the central portion of the wafer and at the outer peripheral portion of the wafer.

Returning back to FIGS. 1 and 2, the mask having a width that does not generally vary at the central portion and outer peripheral portion of the wafer is formed, and the underlying main magnetic pole 44 is formed in the ion milling 1 (step 114) (FIG. 2(3)). After that, ion milling 2 is performed to shape the main magnetic pole 44 into an inverted trapezoid in step 116 (FIG. 2(4)). An incident angle of an ion used for the ion milling 2 is in a range of 60 degrees to 65 degrees. The organic film 444 is peeled off (step 118) after the ion milling 2 to complete the main magnetic pole 44.

Figure 8:
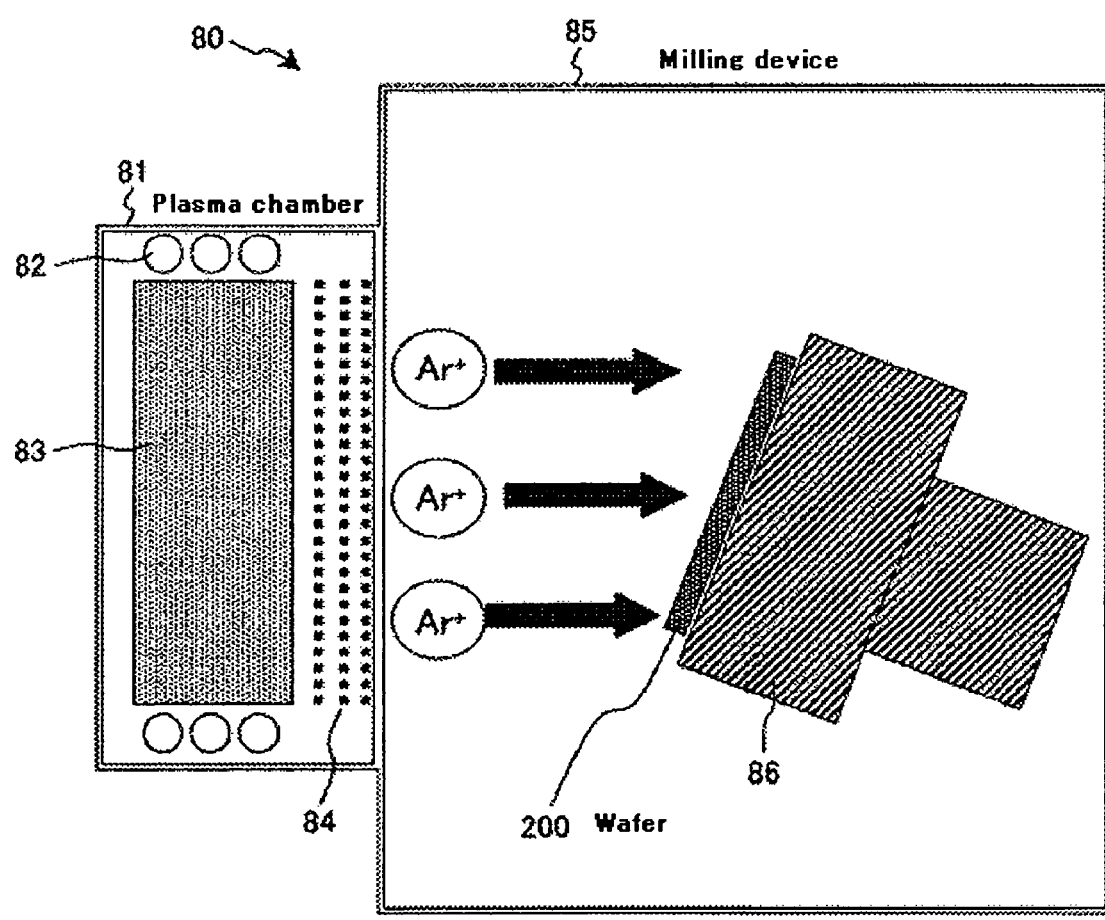
FIG. 8 is a diagram showing an outline configuration of an ion milling apparatus.
Figure 9:
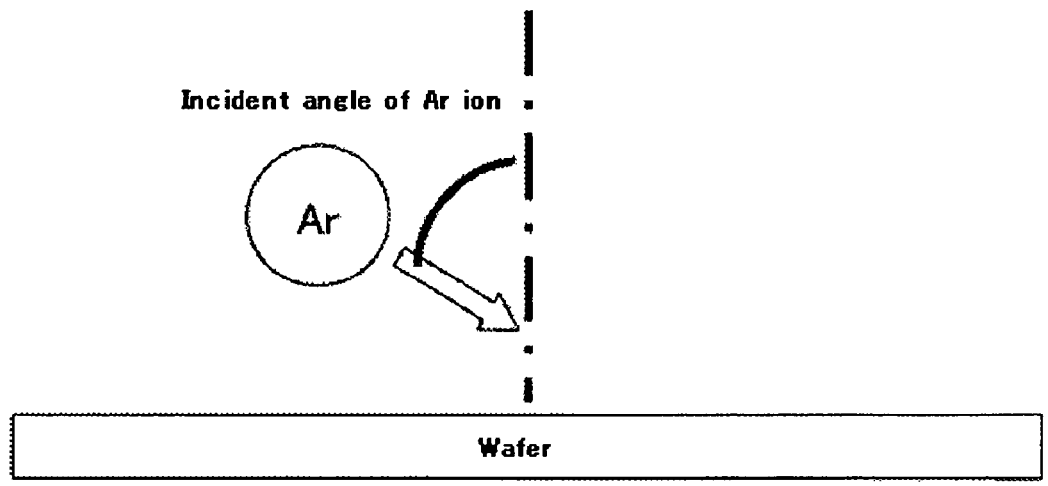
FIG. 9 is a diagram showing the definition of an incident angle of an Ar ion.
Figure 10:
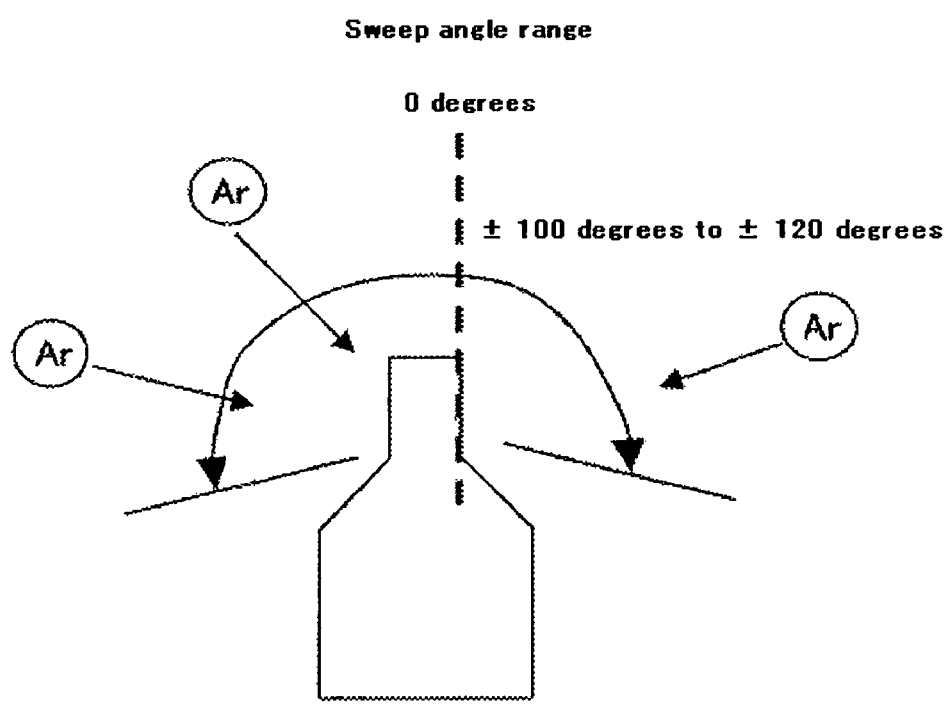
FIG. 10 is a diagram showing a sweep angle of an ion used for the ion milling.

FIG. 8 shows an outline configuration of an ion milling apparatus used to form the main magnetic pole 44. The ion milling apparatus 80 has a plasma chamber 81 and a milling device 85. The plasma chamber 81 receives the Ar gas and supplies high frequency power (or a microwave power) to a coil 82 to generate plasma 83. The ion milling apparatus 80 uses an acceleration grid 84 to introduce an Ar ion present in the plasma 83 into the milling device 85. The Ar ion introduced into the milling device 85 collides with the wafer 200 held by a wafer holder 86 provided in the milling device 85. It should be noted that the potential of the wafer holder 86 is typically equal to the ground potential. FIG. 9 shows the definition of the incident angle of the Ar ion with respect to the surface of the wafer. FIG. 10 shows a sweep angle when the main magnetic pole is subjected to the ion milling.

Figure 11:
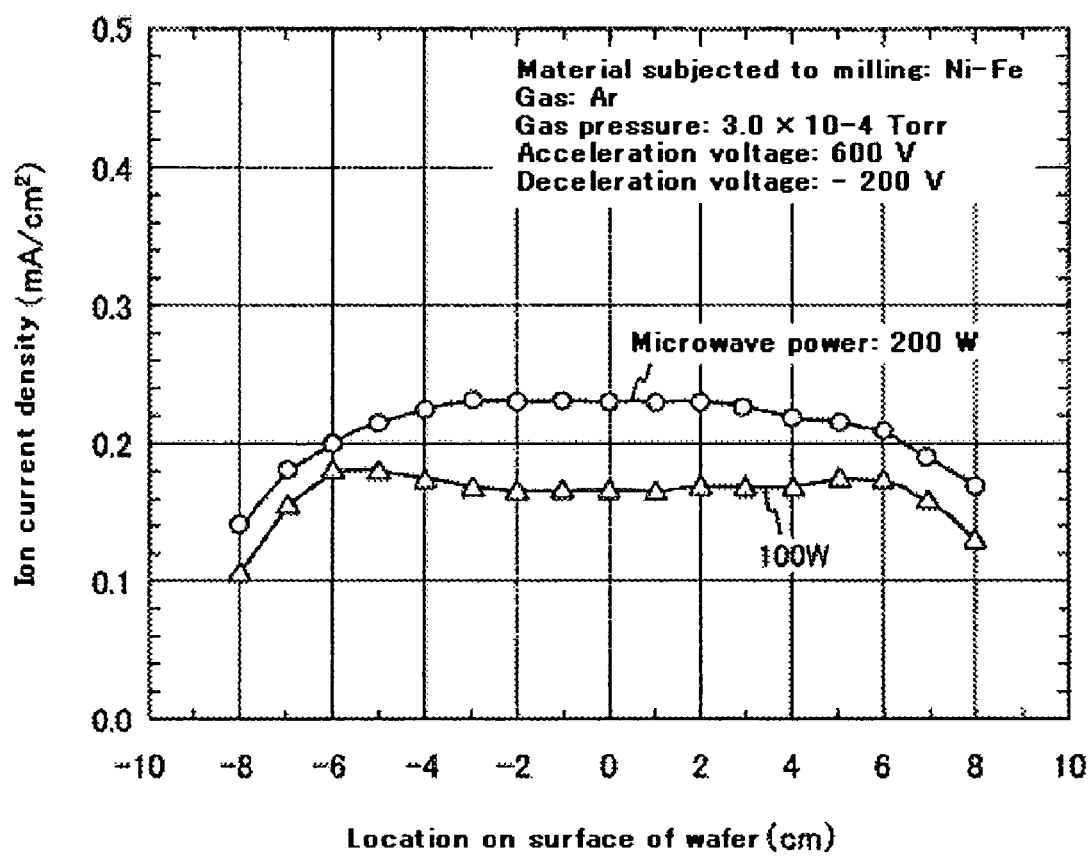
FIG. 11 is a graph showing the relationship between a location on the surface of a wafer and an ion current density in the case where power supplied to a plasma source is changed.
Figure 12:
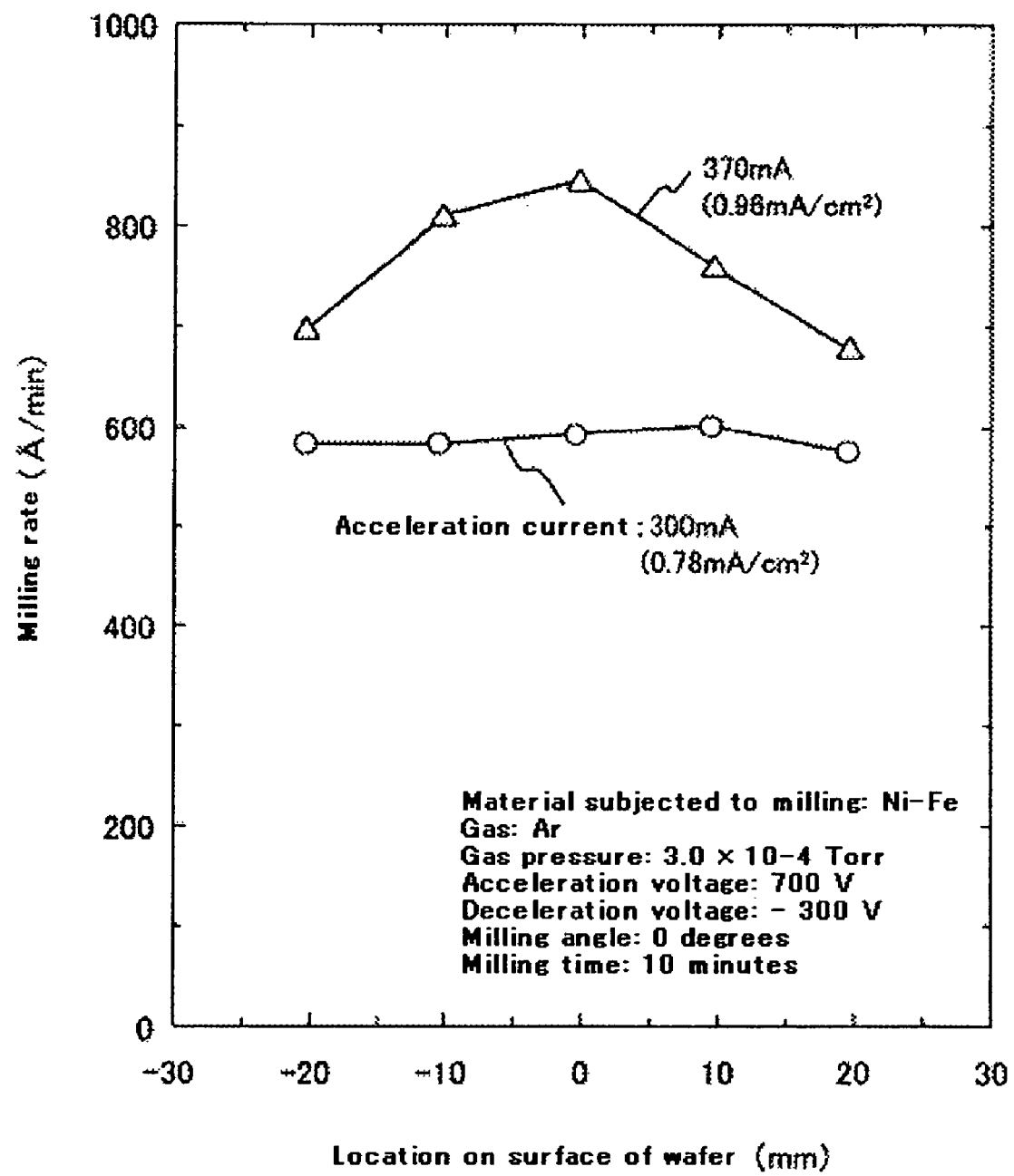
FIG. 12 is a graph showing the relationship between a location on the surface of the wafer and a milling rate in the case where an ion acceleration current is changed.

In one embodiment, the milling rate at the central portion of the wafer is increased by controlling the flow rate of the Ar gas. In addition to this, the milling rate at the central portion of the wafer can be controlled by controlling pressure of the Ar gas, power (power supplied to the plasma source) supplied to the coil for generating plasma, or a current (ion acceleration current) supplied to the acceleration grid and for accelerating an ion. FIG. 11 shows the relationship between a location on the wafer and an ion current density in the case where the power (microwave power) supplied to the plasma source is 200 W and 100 W. Since the ion current density at the central portion of the surface of the wafer can be increased by increasing the power supplied to the plasma source to 200 W, the milling rate can be increased. FIG. 12 shows the relationship between a location on the wafer and the milling rate in the case where the ion acceleration current supplied to the acceleration grid 84 is 370 mA and 300 mA. The milling rate at the central portion of the surface of the wafer can be increased by increasing the ion acceleration current to 370 mA.

In the embodiments, the method for manufacturing the perpendicular magnetic recording head having the read head and the write head is described. However, embodiments of the present invention can be applied to a method for manufacturing a perpendicular magnetic recording head only having the write head. In this case, step 1108 and the subsequent steps shown in FIG. 13 are performed.

As described above, embodiments of the present invention makes it possible to obtain the perpendicular magnetic recording head including the main magnetic pole of the write head having a width that does not generally vary at the central portion of the wafer and at the outer peripheral portion of the wafer.

What is claimed is:

1. A method for manufacturing a perpendicular magnetic recording head, comprising:
    forming a main magnetic pole;
    forming an auxiliary magnetic pole; and
    forming a coil, wherein forming the main magnetic pole includes:
        forming a magnetic film above a wafer;
        forming a mask member on the magnetic film;
        performing reactive ion etching (RIE) on the mask member to form a mask; and
        performing ion milling on the mask under a condition that a milling rate at a central portion of the wafer is higher than a milling rate at an outer peripheral portion of the wafer in order to correct a difference between a large width of the mask located at the central portion of the wafer and a small width of the mask located at the outer peripheral portion of the wafer, and performing ion milling on the magnetic film, the difference occurring during the reactive ion etching (RIE).

2. The method according to claim 1, wherein a flow rate of an Ar gas is controlled in order to set the milling rate at the central portion of the wafer to be higher than the milling rate at the outer peripheral portion of the wafer in performing the ion milling on the mask and performing the ion milling on the magnetic film.

3. The method according to claim 2, wherein the flow rate of the Ar gas is 24 sccm or more.

4. The method according to claim 1, wherein pressure of the Ar gas is controlled in order to set the milling rate at the central portion of the wafer to be higher than the milling rate at the outer peripheral portion of the wafer in performing the ion milling on the mask and performing the ion milling on the magnetic film.

5. The method according to claim 1, wherein power supplied to a plasma source is controlled in order to set the milling rate at the central portion of the wafer to be higher than the milling rate at the outer peripheral portion of the wafer in performing the ion milling on the mask and performing the ion milling on the magnetic film.

6. The method according to claim 1, wherein an ion acceleration current is controlled in order to set the milling rate at the central portion of the wafer to be higher than the milling rate at the outer peripheral portion of the wafer in performing the ion milling on the mask and performing the ion milling on the magnetic film.

7. The method according to claim 1, further comprising controlling a combination of a flow rate of an Ar gas, a pressure of the Ar gas, a power supplied to a plasma source, and an ion acceleration current in order to set the milling rate at the central portion of the wafer to be higher than the milling rate at the outer peripheral portion of the wafer when performing the ion milling on the mask and performing the ion milling on the magnetic film.

8. The method according to claim 1, wherein the mask member is a film formed by laminating a first inorganic film made of $Al_2O_3$, an organic film, and a second inorganic film made of $SiO_2$.

9. The method according to claim 1, further comprising forming a read head before forming the main magnetic pole, the auxiliary magnetic pole; and the coil.

10. The method according to claim 9, wherein forming the read head includes forming a magnetoresistance effect element between a lower magnetic shield and an upper magnetic shield, and wherein the magnetoresistance effect element is selected from a giant magnetoresistance effect (GMR) element, a tunnel magnetoresistance effect (TMR) element, and a current perpendicular to plane (CPP) giant magnetoresistance effect (GMR) element capable of causing a current to flow perpendicularly to a film surface.

11. A method for manufacturing a perpendicular magnetic recording head, the method comprising:
    forming a first auxiliary magnetic pole above a wafer;
    forming a coil above the first auxiliary magnetic pole;
    forming a magnetic film above the coil;
    forming a mask member on the magnetic film;
    performing reactive ion etching (RIE) on the mask member to form a mask; and
    performing ion milling on the mask under a condition that a milling rate at a central portion of the wafer is higher than a milling rate at an outer peripheral portion of the wafer in order to correct a difference between a large width of the mask located at the central portion of the wafer and a small width of the mask located at the outer peripheral portion of the wafer, and performing ion milling on the magnetic film to form a main magnetic pole, the difference occurring during the reactive ion etching (RIE); and
    cutting the wafer.

12. The method according to claim 11, further comprising controlling a combination of a flow rate of an Ar gas, a pressure of the Ar gas, a power supplied to a plasma source, and an ion acceleration current in order to set the milling rate at the central portion of the wafer to be higher than the milling rate at the outer peripheral portion of the wafer when performing the ion milling on the mask and performing the ion milling on the magnetic film.

13. The method according to claim 11, further comprising forming a second auxiliary magnetic pole above the main magnetic pole.

14. The method according to claim 11, further comprising forming a read head before forming the first auxiliary magnetic pole.

15. A method for manufacturing a perpendicular magnetic recording head, comprising the steps of:
    forming a magnetic film above a wafer;
    forming a mask member on the magnetic film;

performing reactive ion etching (RIE) on the mask member to form a mask;

performing ion milling on the mask under a condition that a milling rate at a central portion of the wafer is higher than a milling rate at an outer peripheral portion of the wafer in order to correct a difference between a large width of the mask located at the central portion of the wafer and a small width of the mask located at the outer peripheral portion of the wafer, and performing ion milling on the magnetic film to form a main magnetic pole, the difference occurring during the reactive ion etching (RIE);

forming a coil above the main magnetic pole;

forming an auxiliary magnetic pole above the coil; and cutting the wafer.

16. The method according to claim 15, further comprising controlling a combination of a flow rate of an Ar gas, a pressure of the Ar gas, a power supplied to a plasma source, and an ion acceleration current in order to set the milling rate at the central portion of the wafer to be higher than the milling rate at the outer peripheral portion of the wafer when performing the ion milling on the mask and performing the ion milling on the magnetic film.

17. The method according to claim 15, further, comprising forming a read head before the step of forming the magnetic film.

* * * * *